Jan. 17, 1928.
J. LEDWINKA
1,656,206
WHEEL
Filed March 19, 1927
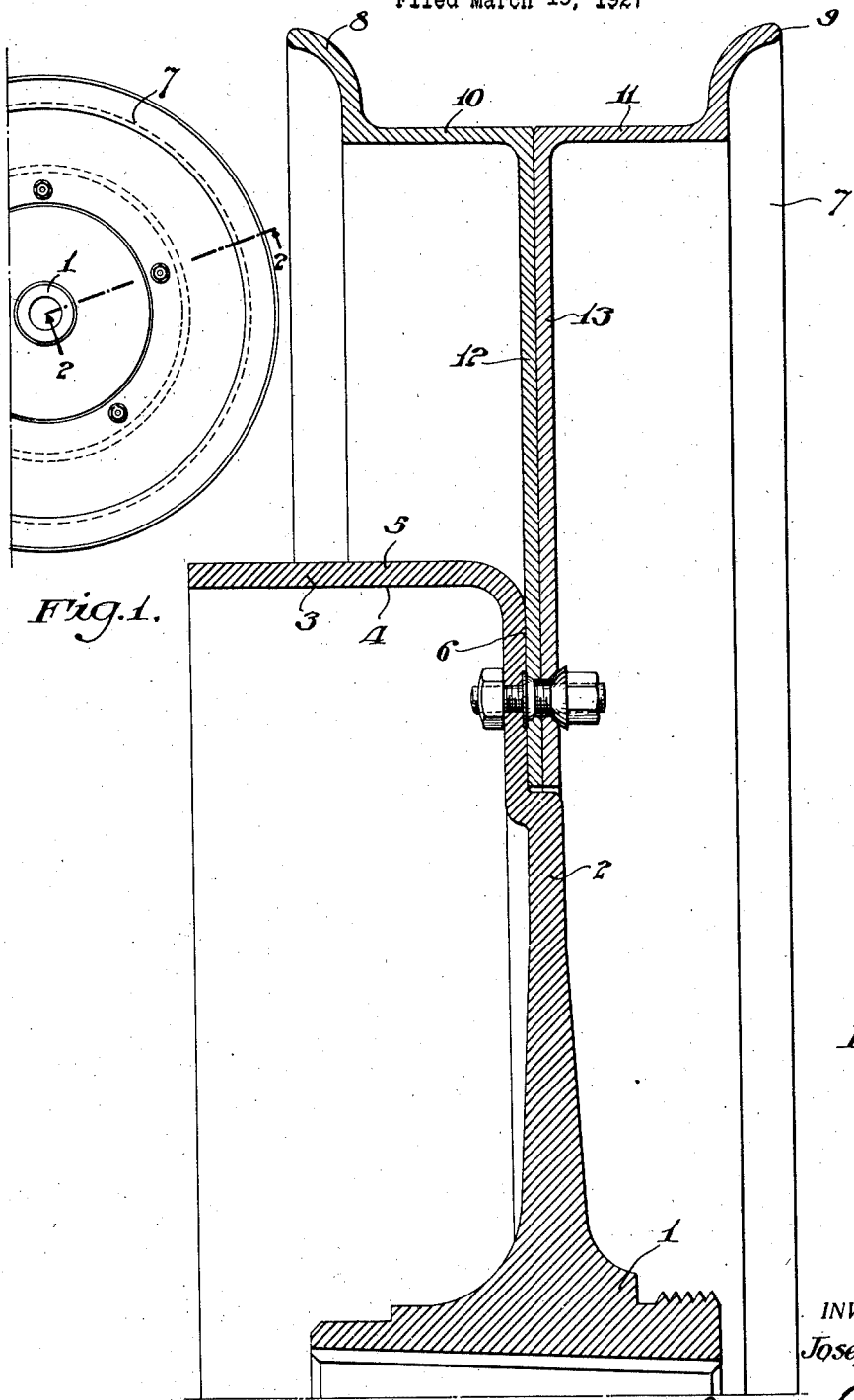

Patented Jan. 17, 1928.

1,656,206

UNITED STATES PATENT OFFICE.

JOSEPH LEDWINKA, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

WHEEL.

Application filed March 19, 1927. Serial No. 176,595.

This invention relates to wheels and more particularly to disc vehicle wheels of the detachable or demountable type.

The development of machinery for efficiently producing wheel hubs and brake drums of integral formation has rendered more simple than has heretofore been possible, the structure of vehicle wheels. In disk wheels of the detachable or demountable type it no longer becomes necessary to provide the wheel hub with a flange and permanently fasten a brake drum to one side of the flange and to demountably attach the wheel disk and rim to the other side of the hub flange. The construction of the wheel may be made lighter, simpler and more economical by attaching the wheel disk to the brake drum head. The wheel of my invention contemplates such construction and its design fully attains the object of invention hereinafter set forth.

It is an object of my invention to provide a demountable disk wheel of light, simple and economically manufactured construction.

This object is attained in general by integrally forming the wheel hub and brake drum. The head of the drum has pressed therein an annular seat. The wheel rim is circumferentially split and each portion thereof is provided with an inturned flange. These inturned flanges are seated on said brake drum seat and are detachably fastened thereto by suitable fastening means. The split rim provides the means whereby the tire may be readily and easily mounted on and taken off the rim. With the brake drum formed integrally with the hub and the wheel disk attached to the brake drum head, so that the wheel disk need not be extended from the rim toward the hub as far as is necessary in a non-integral hub and brake drum construction, the simplified and lightened construction made possible is at once apparent. The advent of the four wheel brake has made this construction particularly desirable since brake drums are required for all four wheels instead of merely the rear two.

In the drawings accompanying this application and disclosing the embodiment of my invention selected for illustration, Fig. 1 is a view in elevation of a portion of a wheel constructed in accordance with my invention and, Fig. 2 is a sectional view on an enlarged scale taken on line 2—2 of Fig. 1.

The hub 1 of my wheel has mounted thereon, but preferably formed integrally therewith, a brake drum 2 having the customary flange 3 providing the required braking surfaces 4 and 5. Formed in the head of the brake drum by pressing or other suitable method is an annular depression or seat 6. Rim 7 is circumferentially divided preferably at a point midway between the two tire retaining flanges 8 and 9 forming thereby a two-part rim. Each of the two parts 10 and 11 is provided with an inturned flange 12 and 13 respectively, preferably coextensive in the direction of the hub 1. The inturned flanges 12 and 13 are of sufficient inherent rigidity and strength to support its own half of the rim without connection to the other and are seated on seat 6 of the brake drum and detachably fastened thereto in any suitable manner, such as by means of the bolt and nut arrangement shown in the drawing.

It is to be understood that the diameter of the brake drum may be varied as desired, from which it follows that, for a wheel of given diameter, the inturned flanges 12 and 13 will vary in length inversely as the drum diameter and the rim may be supported at any desired distance from the drum flange. But should the rim be spaced far enough from the drum flange so that there is a possibility of the two parts of the rim separating under the pressure of the tire, road shocks or other causes, the inturned flanges may be held together by any suitable means at spaced points adjacent the rim.

Thus is provided a wheel characterized by lightness, simplicity and economy of manufacture. The lightness is attained by the saving of metal resulting from the integral construction of hub and brake drum and the mounting of the wheel body to the head of the brake instead of in a region nearer the hub. Simplicity is provided by constructing the complete wheel of only three parts, exclusive of the fastening means on the drum seat, the three parts constituting the integral hub and drum and the two rim parts. The economy of manufacture characterizing this wheel results from the saving in time and material made possible by forming the hub and brake drum integrally and by constructing the wheel body, including the rim, of two identical parts. Further saving in time results from the ease with which a wheel of such simple construction may be assembled.

Having described my invention, what I claim as new and desire to secure by Letters Patent is:

In a wheel, a hub, a brake drum and a two part rim having coextensive inturned flanges mounted on said brake drum and connected thereto but extending freely of each other from brake drum to rim and each of sufficient inherent rigidity and strength to support its own half of the rim without connection to the other.

In testimony whereof he hereunto affixes his signature.

JOSEPH LEDWINKA.